US012539810B2

(12) United States Patent
Tagashira et al.

(10) Patent No.: US 12,539,810 B2
(45) Date of Patent: Feb. 3, 2026

(54) DRIVING ASSISTANCE DEVICE AND NON-TRANSITORY STORAGE MEDIUM STORING A DRIVING ASSISTANCE PROGRAM

(71) Applicant: TOYOTA JIDOSHA KABUSHIKI KAISHA, Aichi (JP)

(72) Inventors: Yuto Tagashira, Toyota (JP); Kazuki Fukazawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/603,210

(22) Filed: Mar. 13, 2024

(65) Prior Publication Data

US 2024/0317137 A1        Sep. 26, 2024

(30) Foreign Application Priority Data

Mar. 22, 2023   (JP) .................................. 2023-045312

(51) Int. Cl.
*B60Q 9/00*        (2006.01)
(52) U.S. Cl.
CPC .................................... *B60Q 9/008* (2013.01)
(58) Field of Classification Search
None
See application file for complete search history.

(56) References Cited

U.S. PATENT DOCUMENTS

| | | | |
|---|---|---|---|
| 6,676,186 B2* | 1/2004 | Greif ....................... | E05F 15/40 49/27 |
| 7,341,264 B2* | 3/2008 | Swannie ................ | G01S 15/931 280/164.1 |
| 8,830,317 B2* | 9/2014 | Meier ....................... | B60Q 1/00 348/148 |
| 9,068,390 B2* | 6/2015 | Ihlenburg ................ | E05F 15/40 |
| 9,154,746 B2* | 10/2015 | Kageta .................... | H01R 43/26 |
| 9,199,576 B2* | 12/2015 | Van Wiemeersch .... | B60R 21/01 |
| 9,587,417 B2* | 3/2017 | Van Gastel ............. | E05B 81/78 |
| 9,969,261 B2 | 5/2018 | Kodama | |
| 10,045,173 B1 | 8/2018 | Morimura et al. | |
| 10,104,271 B2* | 10/2018 | Kiehl ...................... | H04N 23/51 |
| 10,106,157 B2 | 10/2018 | Sawada et al. | |
| 10,150,407 B2 | 12/2018 | Takahashi et al. | |
| 10,348,944 B2* | 7/2019 | Kiehl ...................... | H04N 23/54 |
| 10,696,297 B2 | 6/2020 | Nguyen Van et al. | |

(Continued)

FOREIGN PATENT DOCUMENTS

| | | | | |
|---|---|---|---|---|
| JP | 2005-297636 A | 10/2005 | | |
| JP | 2006145248 A | 6/2006 | | |
| KR | 20200081522 A | * 7/2020 | ............. | B60K 35/00 |

*Primary Examiner* — Muhammad Adnan
(74) *Attorney, Agent, or Firm* — HAUPTMAN HAM, LLP

(57) ABSTRACT

The processor controls the notification device to issue an alert when it detects an obstacle within a predetermined first alert target area extending rearward from the own vehicle in a first situation, where neither the tailgate TG nor the cargo protrudes beyond the rear end of the rear bumper RB. In a second situation, where a part of the opened tailgate TG or part of the cargo protrudes beyond the rear end of the rear bumper RB, the processor controls the notification device to issue an alert when an obstacle OB is detected within a second alert target area, which is extended or offset rearward from the first alert target area.

17 Claims, 5 Drawing Sheets

(56) References Cited

U.S. PATENT DOCUMENTS

| | | | |
|---|---|---|---|
| 11,001,255 B2 | 5/2021 | Fukuman et al. | |
| 11,091,159 B2* | 8/2021 | Saito | B60K 35/29 |
| 11,110,937 B2 | 9/2021 | Kinoshita et al. | |
| 11,615,566 B2* | 3/2023 | Corcoran | H04N 23/90 |
| | | | 348/148 |
| 11,772,574 B2* | 10/2023 | Berne | B60R 11/04 |
| | | | 396/428 |
| 2003/0052969 A1* | 3/2003 | Satoh | B60R 1/26 |
| | | | 348/148 |
| 2005/0237168 A1* | 10/2005 | Matsukawa | B60Q 1/447 |
| | | | 340/932.2 |
| 2006/0103512 A1 | 5/2006 | Fukuda et al. | |
| 2013/0038731 A1* | 2/2013 | Brey | B60R 11/04 |
| | | | 348/148 |
| 2015/0009062 A1* | 1/2015 | Herthan | G01S 13/0209 |
| | | | 342/70 |
| 2016/0195430 A1* | 7/2016 | Sticherling | G01J 1/4228 |
| | | | 250/349 |
| 2019/0001968 A1 | 1/2019 | Yorifuji et al. | |
| 2019/0128040 A1* | 5/2019 | Mitchell | E05F 15/73 |
| 2019/0153770 A1* | 5/2019 | Mitchell | G01S 13/56 |
| 2019/0267993 A1* | 8/2019 | Sawada | G01V 3/08 |
| 2019/0309564 A1* | 10/2019 | Mitchell | B60Q 5/005 |
| 2019/0344828 A1 | 11/2019 | Omori et al. | |
| 2019/0389488 A1 | 12/2019 | Yamada et al. | |
| 2020/0192189 A1* | 6/2020 | Kasai | B60R 11/04 |
| 2022/0063515 A1* | 3/2022 | Mckendrick | B60R 11/04 |

* cited by examiner

DRIVING ASSISTANCE DEVICE AND NON-TRANSITORY STORAGE MEDIUM STORING A DRIVING ASSISTANCE PROGRAM

RELATED APPLICATIONS

The present application claims priority to Japanese Patent Application No. 2023-045312, filed Mar. 22, 2023, the disclosure of which is hereby incorporated by reference herein in its entirety.

BACKGROUND OF THE INVENTION

The present invention relates to a driving assistance device and a driving assistance program that detect obstacles located behind an own vehicle and execute a predetermined alert for the driver based on the detection results.

DESCRIPTION OF THE RELATED ART

A driving assistance device has been proposed that detects obstacles located behind an own vehicle and executes a predetermined alert for the driver based on the detection results (see, for example, Patent Document 1 below). This driving assistance device (hereinafter, referred to as "conventional device") includes a sonar (ultrasonic sensor). The sonar is incorporated into the rear bumper of the own vehicle. It emits ultrasonic waves to the rear of the own vehicle, which are then reflected off obstacles. The sonar receives these reflected waves. Based on the received reflected waves, the conventional device's processor can detect the distance and direction of the obstacles from the rear bumper, and it controls the notification device to issue an alert when an obstacle is detected behind the own vehicle.

Patent Document 1: Japanese Patent Laid-Open No. 2005-297636

SUMMARY

The conventional device is applied, for example, to pickup trucks. In the state where the tailgate of the cargo bed of a pickup truck is opened, a part of the tailgate (rear end) may protrude rearward beyond the rear end of the rear bumper. Also, even when the tailgate is closed, part of the cargo (load) on the cargo bed may protrude rearward beyond the rear end of the rear bumper. In the following description, the part of the tailgate or cargo that protrudes rearward beyond the rear end of the rear bumper is referred to as the "rearward protrusion". If the driver forgets about the presence of the rearward protrusion, they may believe they have more time to avoid a collision with an obstacle when the alert starts, leading to a delayed response. However, in reality, the rearward protrusion may be quite close to the obstacle when the alert starts, increasing the risk of a collision.

One of the objectives of this invention is to provide a driving assistance device that can prevent collisions between parts of the vehicle body or loaded cargo and obstacles located behind the own vehicle.

To solve the above issues, the driving assistance device (1) of the present invention includes:

a rear sensor (20) that acquires information about obstacles located behind the own vehicle (V), and a processor (10) that controls the own vehicle's notification device to issue a predetermined alert to the driver when it detects an obstacle behind the own vehicle based on the information obtained from the rear sensor. The processor controls the notification device (30) to issue an alert when an obstacle is detected within a specified first alert target area (AR) extending rearward in a first situation where the tailgate and cargo of the own vehicle do not protrude beyond the rear end of the rear bumper (RB). In a second situation where a part of the opened tailgate or part of the cargo protrudes beyond the rear end of the rear bumper, the processor controls the notification device to issue an alert when an obstacle is detected within a second alert target area (EAR) that is extended or offset rearward from the first alert target area.

The processor of the driving assistance device according to the present invention issues an alert when it detects an obstacle within the second alert target area, which is extended or offset rearward, in the presence of a rearward protrusion. Thus, when an obstacle enters the second alert target area from its rear, the distance between the rearward protrusion and the obstacle is relatively long. Therefore, even if the start of the driving operation to avoid the obstacle is slightly delayed from the time the alert starts, there is a high possibility of avoiding a collision between the rearward protrusion and the obstacle. Hence, according to the present invention, collisions between the rearward protrusion and obstacles can be prevented.

In one embodiment of the driving assistance device according to the present invention, the processor detects the protrusion length of the tailgate or cargo from the rear end of the rear bumper and determines the second alert target area based on this protrusion length.

Accordingly, the processor can appropriately set the second alert target area.

Furthermore, to solve the above issues, the driving assistance device (1A) according to the present invention includes:

a rear sensor that acquires information about obstacles located behind the own vehicle, and a processor that controls the own vehicle's notification device to issue a predetermined alert to the driver when it detects an obstacle within the alert target area extending rearward based on the information obtained from the rear sensor. The processor controls the notification device to issue a first alert when an obstacle is detected within a first section of the alert area in a first situation where the tailgate and cargo of the own vehicle do not protrude beyond the rear end of the rear bumper. In a second situation where a part of the opened tailgate or part of the cargo protrudes beyond the rear end of the rear bumper, the processor controls the notification device to issue a second, higher-level alert than the first alert when an obstacle is detected within the first section.

The processor of the driving assistance device according to the present invention increases the alert level when the rearward protrusion is present, compared to when it is not. In other words, a relatively high-level alert is issued when an obstacle enters the alert target area from its rear. Therefore, the driver is more likely to start the driving operation to avoid the obstacle relatively early from the time the alert starts. Hence, according to this invention, collisions between the rearward protrusion and obstacles can be prevented.

DESCRIPTION OF THE EMBODIMENTS

First Embodiment (Overview) The driving assistance device 1 according to the first embodiment of the present invention is mounted on a vehicle V (hereinafter referred to as "own vehicle") equipped with an automatic driving function. The driving assistance device 1 has a function (obstacle approach alert function) to control the notification device of the own vehicle to issue a predetermined alert to the driver when it detects an obstacle behind the own vehicle in situations where the automatic driving function is deactivated (situations where the driver is primarily performing the driving operation).

Figure 1:
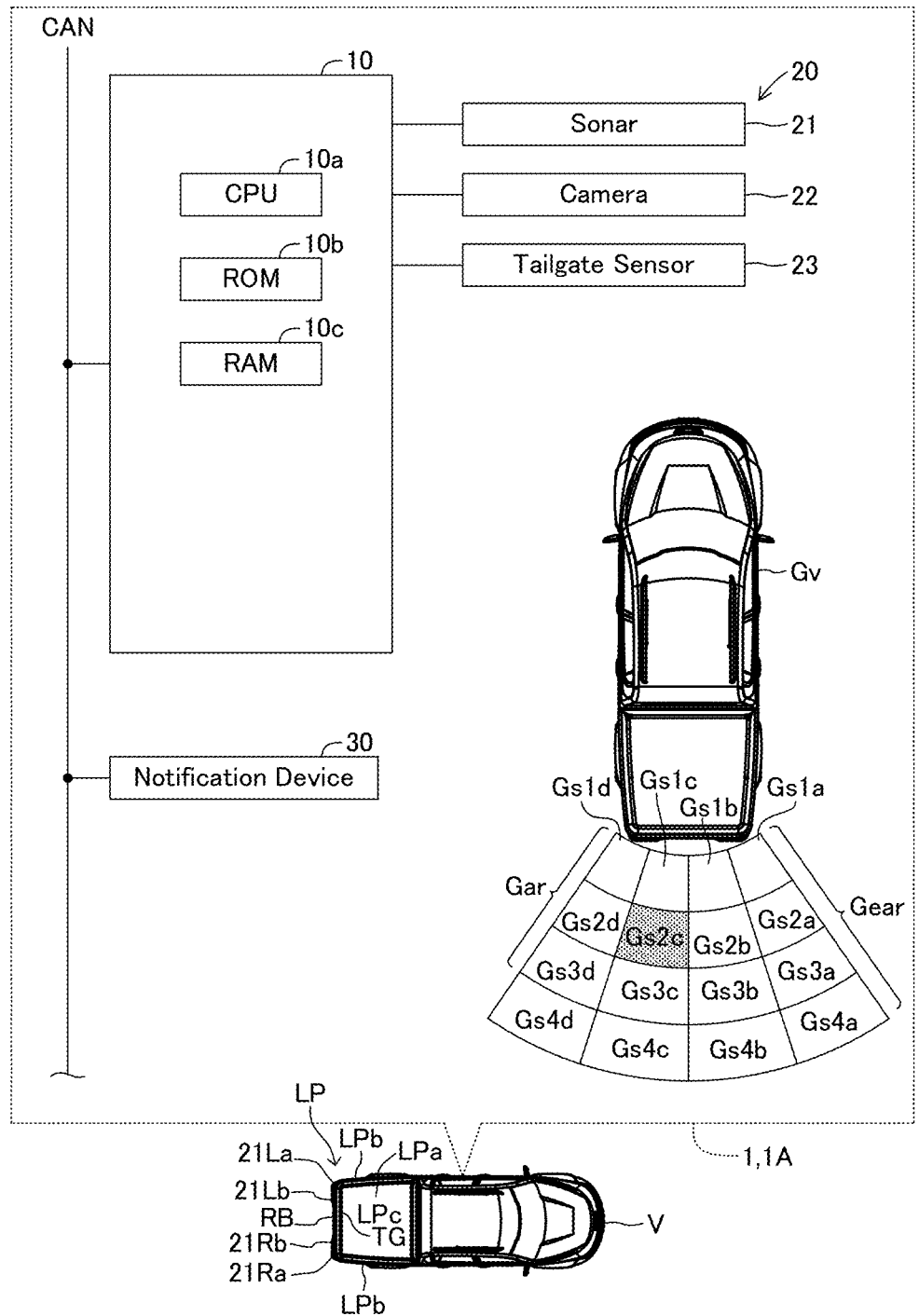
FIG. 1 is a block diagram of a driving assistance device according to a first embodiment of the present invention.

As shown in FIG. 1, the own vehicle is equipped with an upwardly open cargo bed (loading platform) LP. The cargo bed LP includes a bottom wall part LPa, a pair of left and right side wall parts LPb, LPb, and a rear wall part LPc. The rear wall part LPc is a plate-shaped part extending in the left-right direction (vehicle width direction). The bottom edge of the rear wall part LPc is connected to the bottom wall part LPa via hinges. That is, the rear wall part LPc is connected to the bottom wall part LPa so as to be openable and closable. When the rear wall part LPc is closed, it is substantially vertical to the bottom wall part LPa, and its rear surface is located slightly forward of the rear end of the rear bumper RB in plan view. On the other hand, when the rear wall part LPc is opened, it is substantially parallel to the bottom wall part LPa, and its rear end is located rearward of the rear end of the rear bumper RB. The rear wall part LPc is generally referred to as the tailgate TG.

(Specific Configuration) As shown in FIG. 1, the driving assistance device 1 includes a driving assistance ECU 10, an onboard sensor 20, and a notification device 30.

The driving assistance ECU 10 includes a microcomputer containing a CPU 10a, ROM 10b, RAM 10c, etc. The driving assistance ECU 10 is connected to other ECUs equipped in the own vehicle through a CAN (Controller Area Network).

The onboard sensor 20 includes a rear sensor that acquires information about obstacles OB located behind the own vehicle. Specifically, the onboard sensor 20 includes a sonar 21 and a camera 22 as the rear sensor.

The sonar 21 includes a first transmitter-receiver part 21La, 21Ra and a second transmitter-receiver part 21Lb, 21Rb, as well as a signal analysis part. The first transmitter-receiver part 21La is positioned at the left corner of the rear bumper RB and is directed diagonally backward to the left. The first transmitter-receiver part 21Ra is positioned at the right corner of the rear bumper RB and is directed diagonally backward to the right. The second transmitter-receiver part 21Lb is positioned between the center and the left corner of the rear bumper RB in the vehicle width direction, facing backward. The second transmitter-receiver part 21Rb is positioned between the center and the right corner of the rear bumper RB in the vehicle width direction, facing backward. Each transmitter-receiver part intermittently emits ultrasonic waves and receives ultrasonic waves (reflected waves) reflected by the obstacle OB. Each part then provides the signal analysis part with signals (reflected wave signals) representing the received reflected waves.

The signal analysis part analyzes the reflected wave signals obtained from each transmitter-receiver part to calculate the position (distance and direction) of the obstacle OB relative to the own vehicle and transmits the calculation results to the driving assistance ECU 10. The detection range A of the sonar 21, which is capable of detecting objects, includes not only the area behind the own vehicle but also the area to the side of the rear wheels of the own vehicle, as shown in FIG. 2.

The camera 22 includes an imaging device and an image analysis device. The imaging device is a digital camera with an imaging element, such as a CCD (charge-coupled device), and is directed backward at the rear of the vehicle cabin. It captures the area behind the own vehicle at a predetermined frame rate to acquire image data, which is provided to the image analysis device. The image analysis device analyzes the acquired image data to identify (recognize) the type of obstacle OB located behind the own vehicle from the images. It also recognizes the presence or absence of cargo. The image analysis device then transmits these recognition results to the driving assistance ECU 10.

Furthermore, the onboard sensor 20 includes a tailgate sensor 23. The tailgate sensor 23 includes, for example, a switch device. This switch device is, for example, incorporated into the hinge connecting the tailgate TG to the bottom wall part LPa. In the closed state of the tailgate TG, the switch device is off, and in the opened state of the tailgate TG, the switch device is on. The driving assistance ECU 10 monitors the on/off state of this switch device.

The driving assistance ECU 10 can distinguish between the obstacle OB and the rearward protrusion (tailgate TG or cargo) based on the followability (presence or absence of position changes) of an object located immediately behind the own vehicle.

The notification device 30 includes an image display device and an audio device. It is, for example, incorporated into the instrument panel of the own vehicle. The image display device displays images representing the position of the obstacle OB according to the image display instructions received from the driving assistance ECU 10. The audio device plays a predetermined alert sound according to the sound playback instructions received from the driving assistance ECU 10.

(Obstacle Approach Alert Function) The driving assistance ECU 10 controls the notification device 30 to issue a predetermined alert when it detects an obstacle OB within a certain area (alert target area AR or extended alert target area EAR, described later) of the detectable range A, based on the information obtained from the rear sensors (sonar 21 and camera 22).

The driving assistance ECU 10 continuously determines whether a rearward protrusion exists or not, based on the information obtained from the rear sensors. Specifically, it determines whether the tailgate TG is closed or not based on the on/off state of the switch device of the tailgate sensor 23. Additionally, based on the information from the camera 22, it determines whether there is cargo on the cargo bed LP. If cargo is detected, the sonar 21 acquires information about an object located immediately behind the own vehicle, and based on this information, it determines whether the object is a rearward protrusion or not. For example, if the position of the object located immediately behind the own vehicle remains mostly unchanged, it is likely that the object is the tailgate TG or cargo of the own vehicle. Therefore, the driving assistance ECU 10 determines whether a rearward protrusion exists or not based on the change in position of the object located immediately behind the own vehicle (the range of position change of the object in a certain short time).

The driving assistance ECU 10 determines that there is no rearward protrusion present when both Condition X and Condition Y are met:

[Condition X] The switch device of the tailgate sensor 23 is in the off state.

[Condition Y] There is no cargo, or the range of position change of the object located immediately behind the own vehicle exceeds a threshold.

When the driving assistance ECU 10 determines that there is no rearward protrusion present (first situation), it determines whether an obstacle OB exists within the alert target area AR.

Figure 2B:
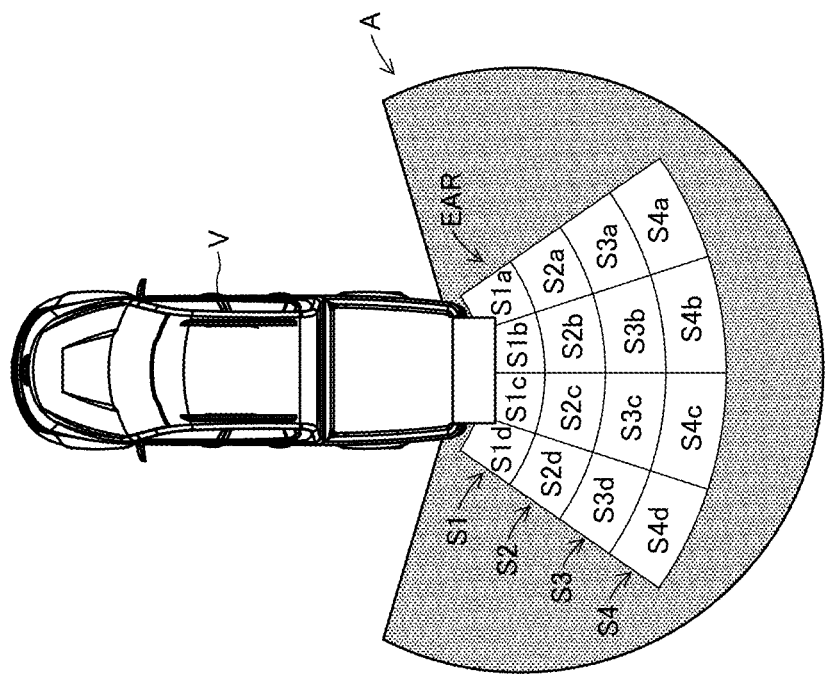
FIG. 2B is a plan view showing the extended alert target area.
Figure 2A:
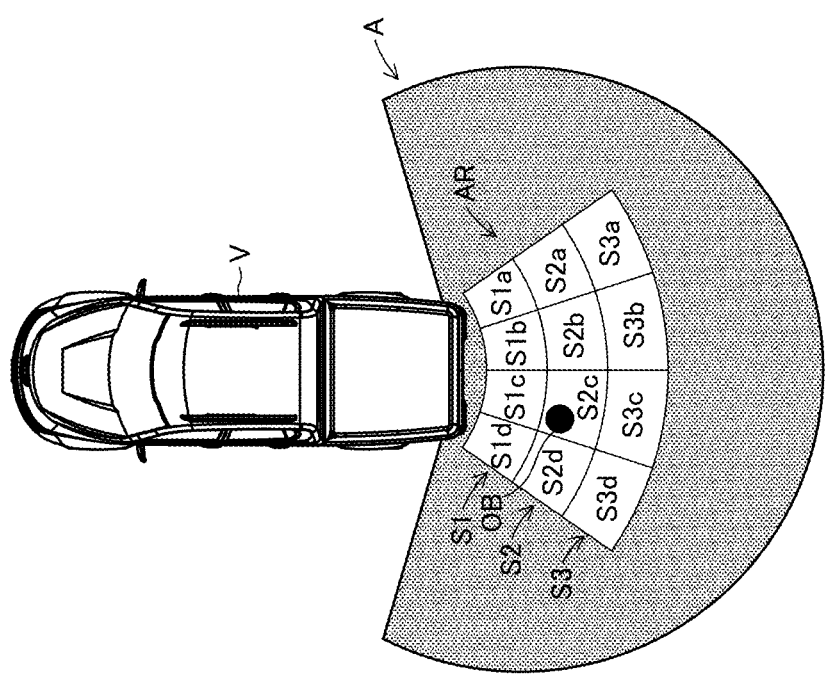
FIG. 2A is a plan view showing the alert target area.

The alert target area AR, as shown in FIG. 2A, has an annular fan shape in plan view. The AR is symmetrically arranged about the centerline passing through the central part in the vehicle width direction. The AR is divided into three equal parts in the radial direction, consisting of sectors S1, S2, and S3. These sectors are arranged in order from the inner to the outer side of the AR. Sector S1 is divided into four parts in the circumferential direction, consisting of segments S1a, S1b, S1c, and S1d, arranged from the right end to the left end of the AR. Sectors S2 and S3 are also divided into four parts in the circumferential direction. The shape and size of AR, and the number and shape of each sector and segment, are just examples and can be modified as needed.

The driving assistance ECU 10 controls the notification device 30 to issue a predetermined alert to the driver when it determines that an obstacle OB exists within the AR.

Specifically, the driving assistance ECU 10 identifies (acquires) the position (segment) of the obstacle OB in the AR based on the information obtained from the rear sensor. Then, the image display device of the notification device 30 displays an image representing the position of the obstacle OB. For example, the image display device displays an image Gv representing the own vehicle, as shown in FIG. 1. Additionally, an image Gar representing the AR is displayed below the image Gv. The image Gar consists of images Gs1a, Gs1b, . . . , Gs3d corresponding to segments S1a, S1b, . . . , S3d. The driving assistance ECU 10 causes the image Gx corresponding to the position (segment) of the acquired obstacle OB to flash. That is, the display color of the image Gx is inverted at a predetermined period.

Furthermore, the driving assistance ECU 10 intermittently plays an alert sound (beep sound) through the audio device of the notification device 30.

Meanwhile, the driving assistance ECU 10 determines that a rearward protrusion exists when either one or both of the conditions X and Y are not met.

When the driving assistance ECU 10 determines that a rearward protrusion exists (second situation), instead of the AR, it determines whether an obstacle OB exists within the following extended alert target area EAR.

The extended alert target area EAR, as shown in FIG. 2B, corresponds to the area that extends the alert target area AR rearward. Specifically, EAR includes an annular fan-shaped sector S4 added to the outer side of sector S3 of AR. Sector S4 extends from the right end to the left end of sector S3. The width of sector S4 (radial length of EAR) is the same as that of the other sectors. Sector S4 is divided into four parts in the circumferential direction, consisting of segments S4a, S4b, S4c, and S4d, arranged in order from the right end to the left end of sector S4.

When the driving assistance ECU 10 determines that an obstacle OB exists within the EAR, it controls the notification device 30 in the same way as when there is no rearward protrusion.

Specifically, the driving assistance ECU 10 identifies (acquires) the position (segment) of the obstacle OB in the EAR based on the information obtained from the rear sensor. The image display device of the notification device 30 displays an image representing the position of the obstacle OB. When a rearward protrusion exists, the image display device displays the image Gear representing the EAR below the image Gv, as shown in FIG. 1. The image Gear consists of images Gs1a, Gs1b, . . . , Gs4d corresponding to segments S1a, S1b, . . . , S4d. The driving assistance ECU 10 causes the image Gx corresponding to the position (segment) of the acquired obstacle OB to flash.

Additionally, the driving assistance ECU 10 intermittently plays an alert sound (beep sound) through the audio device of the notification device 30.

Figure 3:
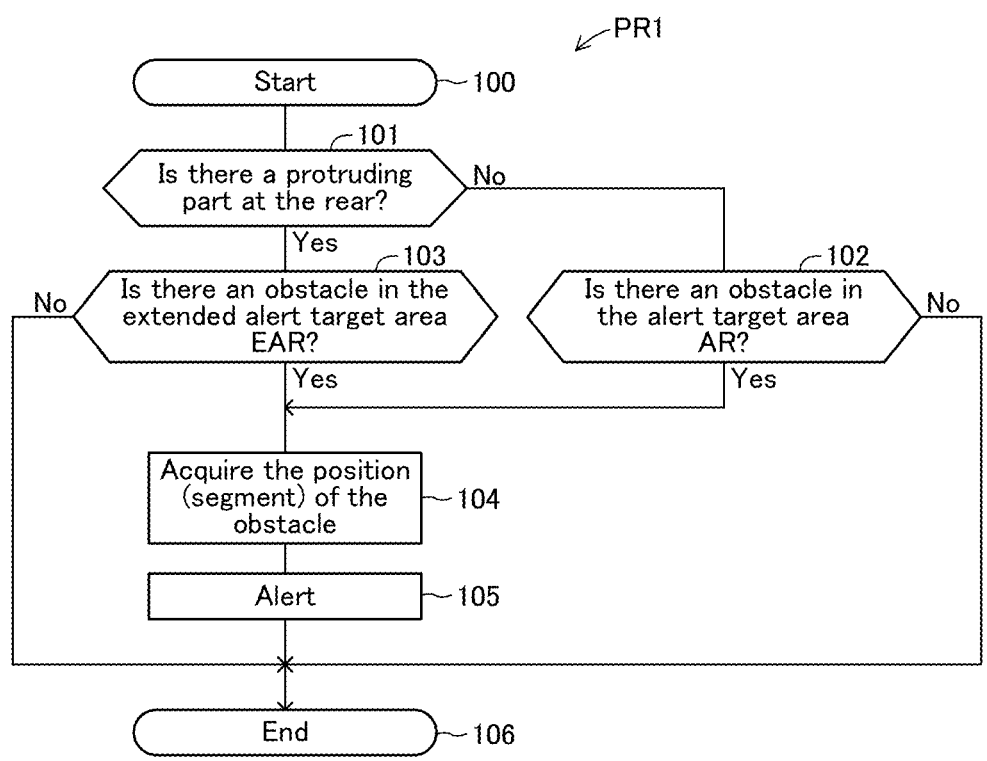
FIG. 3 is a flowchart of a computer program for realizing an obstacle approach alert function of the driving assistance device according to the first embodiment.

Next, the program PR1 executed by the CPU 10a (hereinafter simply referred to as "CPU") for realizing the obstacle approach alert function will be described with reference to FIG. 3.

When the ignition switch of the own vehicle is on, the CPU starts executing program PR1 at a predetermined interval. The CPU starts the execution of program PR1 from step 100 and proceeds to step 101.

At step 101, the CPU determines whether a rearward protrusion exists. If a rearward protrusion is determined to exist (101: Yes), the process proceeds to step 103 described later. On the other hand, if it is determined that no rearward protrusion exists (101: No), the process proceeds to step 102.

At step 102, the CPU determines whether an obstacle OB is located within the AR. If an obstacle OB is determined to be located within the AR (102: Yes), the process proceeds to step 104. Otherwise (102: No), the process proceeds to step 106, where the execution of program PR1 is terminated.

When the CPU proceeds from step 101 to step 103, at step 103 it determines whether an obstacle OB is located within the extended alert target area EAR. If an obstacle OB is determined to be within the EAR (103: Yes), the process moves to step 104. Otherwise (103: No), the process proceeds to step 106, where the execution of program PR1 is terminated.

At step 104, the CPU acquires the position (segment) of the obstacle OB based on the information from the rear sensor. Then, it proceeds to step 105.

At step 105, the CPU controls the notification device 30 to issue a predetermined alert to the driver. Specifically, it causes the image display device to flash image Gx and intermittently plays an alert sound (beep sound) through the audio device. The process then moves to step 106, where the execution of program PR1 is concluded.

(Effect) The driving assistance ECU 10 of the driving assistance device 1 issues an alert when it detects an obstacle OB within the extended alert target area EAR if a rearward protrusion exists. Thus, when an obstacle OB enters sector S4 of the EAR from behind, the distance between the rearward protrusion and the obstacle OB is relatively long. Therefore, even if the start of the driving operation to avoid the obstacle OB is slightly delayed from when the alert starts, there is a high possibility of avoiding a collision. Consequently, this invention can prevent collisions between the rearward protrusion and the obstacle OB.

Second Embodiment

Next, the driving assistance device 1A according to the second embodiment is described. As shown in FIG. 1, the configuration of driving assistance device 1A is the same as that of driving assistance device 1.

(Obstacle Approach Alert Function) The driving assistance ECU 10, similar to the first embodiment, continuously determines whether a rearward protrusion exists or not. If it determines that no rearward protrusion exists, it determines whether an obstacle OB is located within the AR, similar to the first embodiment. Then, the driving assistance ECU 10 controls the notification device 30 to issue a predetermined alert according to the position (sector) of the obstacle OB if it is located within the AR.

Figure 4B:
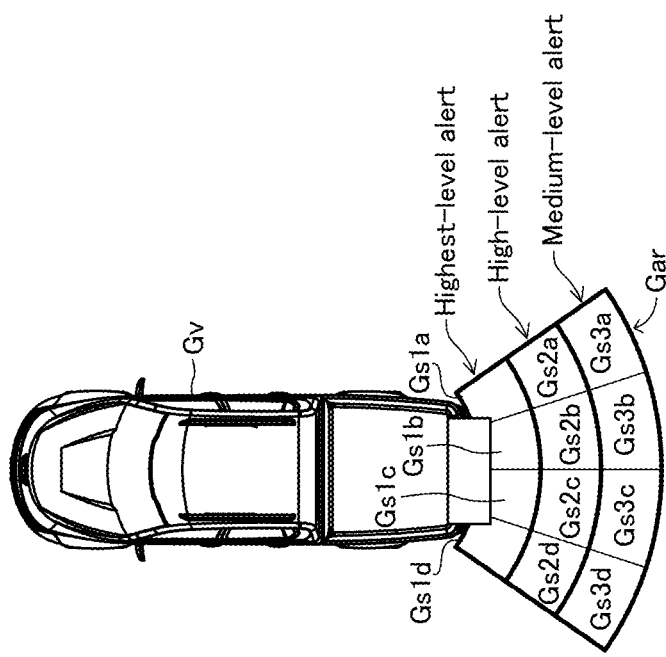
FIG. 4B is another example of an image displayed as an alert by the driving assistance device according to the second embodiment.
Figure 4A:
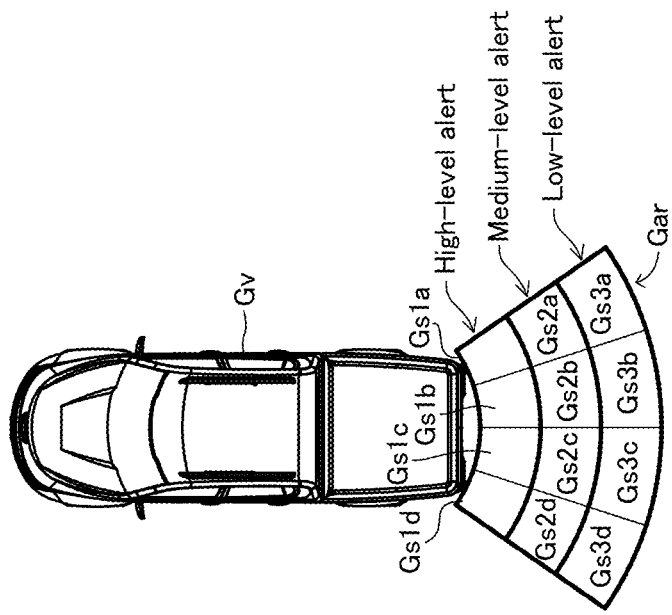
FIG. 4A is an example of an image displayed as an alert by the driving assistance device according to the second embodiment.

Specifically, as shown in FIG. 4A, if the obstacle OB is located in sector S3, the driving assistance ECU 10 controls the notification device 30 to issue a low-level alert. For example, the ECU 10 controls the device such that the flashing interval of image Gx and the repetition interval of the alert sound are relatively long. If the obstacle OB is in sector S2, a mid-level alert is issued, with moderate intervals for both the flashing of image Gx and the alert sound. For an obstacle in sector S1, a high-level alert is issued, with relatively short intervals.

In the second embodiment, unlike the first where the driving assistance ECU 10 determines if an obstacle OB is in the extended alert target area EAR when a rearward protrusion is detected, here it determines if an obstacle is in the alert target area AR. If an obstacle OB is detected within AR, the device issues an alert according to the obstacle's position (sector).

In this case, if the obstacle OB is in sector S3, a mid-level alert is issued instead of a low-level one; if in S2, a high-level alert is issued instead of a mid-level one. For an obstacle in S1, the highest level of alert is issued, with continuous illumination of image Gx and a continuous alert sound.

Figure 5:
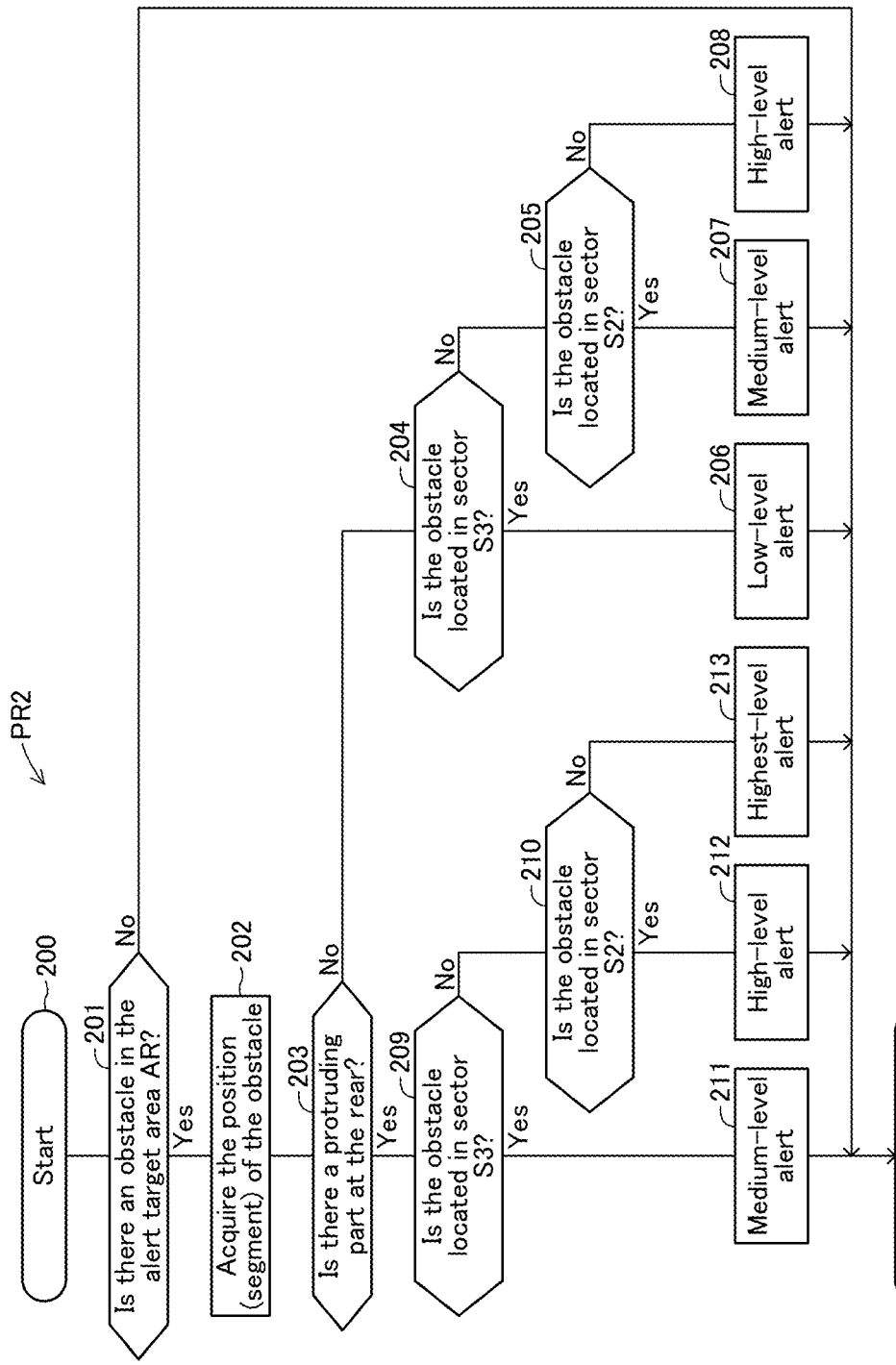
FIG. 5 is a flowchart of a computer program for realizing an obstacle approach alert function of the driving assistance device according to the second embodiment.

Next, the program PR2 executed by the CPU for realizing the obstacle approach alert function in the second embodiment will be explained with reference to FIG. 5.

When the vehicle's ignition switch is on, the CPU starts executing program PR2 at a predetermined interval. The CPU starts from step 200 and proceeds to step 201.

At step 201, the CPU determines whether an obstacle OB is located within the alert target area AR. If an obstacle is detected within the AR (201: Yes), it proceeds to step 202. Otherwise (201: No), it moves to step 214, ending the execution of program PR1.

At step 202, the CPU acquires the position (segment) of the obstacle OB based on information from the rear sensor and proceeds to step 203.

At step 203, the CPU determines whether a rearward protrusion exists. If a rearward protrusion is detected (203: Yes), it moves to step 209. Otherwise (203: No), it proceeds to step 204.

At step 204, the CPU determines if the obstacle OB is in sector S3. If yes (204: Yes), it moves to step 206. Otherwise (204: No), it proceeds to step 205.

At step 205, it determines if the obstacle OB is in sector S2. If yes (205: Yes), it proceeds to step 207. Otherwise (205: No), it moves to step 208.

At step 206, a low-level alert is executed. At step 207, a mid-level alert, and at step 208, a high-level alert is executed. Then, it moves to step 214, ending the execution of program PR2.

If the process moves from step 203 to step 209, at step 209, the CPU determines if the obstacle OB is in sector S3. If yes (209: Yes), it proceeds to step 211. Otherwise (209: No), it moves to step 210.

At step 210, the CPU determines if the obstacle OB is in sector S2. If yes (210: Yes), it proceeds to step 212. Otherwise (210: No), it moves to step 213.

At step 211, a mid-level alert is executed. At step 212, a high-level alert, and at step 213, the highest level of alert is executed. Then, it proceeds to step 214, ending the execution of program PR2.

(Effect) The driving assistance ECU 10 of the driving assistance device 1A increases the alert level when a rearward protrusion exists compared to when it does not. Thus, when an obstacle OB enters the AR from behind, a relatively high-level alert is issued. This increases the likelihood of the driver starting the driving operation to avoid the obstacle OB relatively early from when the alert starts. Therefore, this invention can prevent collisions between the rearward protrusion and the obstacle OB.

The present invention is not limited to the above embodiments and can be modified within the scope of the invention.

(Variation 1) In the first embodiment, the width of sector S4 can be different from the other sectors. The driving assistance ECU 10 could calculate the protrusion length of the rearward protrusion based on information from the sonar 21 and set the width of sector S4 accordingly. The driving assistance device 1 can include an input device to input the protrusion length, and the ECU 10 can set the width of sector S4 based on the input length, ensuring the EAR is set appropriately.

(Variation 2) In the first embodiment, instead of using the EAR, the ECU 10 can control the notification device 30 to issue an alert when an obstacle OB is in an offset alert target area, which is the AR offset rearward. The amount of offset can be determined based on the protrusion length of the rearward protrusion.

(Variation 3) In the second embodiment, the CPU sets the interval and repetition interval of the alert sound according to the level of the alert. Alternatively, the display color of image Gx and the tone and volume of the alert sound can be set according to the alert level.

What is claimed is:

1. A driving assistance device, comprising:
a rear sensor configured to acquire information about obstacles located behind an own vehicle; and
a processor configured to, in response to detecting a presence of an obstacle behind the own vehicle based on the information obtained from the rear sensor, control a notification device of the own vehicle to issue a predetermined alert to a driver of the own vehicle; wherein
the processor is configured to,
in a first situation where a tailgate of the own vehicle and a cargo of the own vehicle do not protrude rearward beyond a rear end of a rear bumper of the own vehicle, and in response to detecting the presence of the obstacle behind the own vehicle within a predetermined first alert target area extending rearward of the own vehicle, control the notification device to issue the predetermined alert; and in a second situation where a part of the tailgate, which is opened, or a part of the cargo protrudes rearward beyond the rear end of the rear bumper, and in response to detecting the presence of the obstacle behind the own vehicle within a predetermined second alert target area, which is extended or offset rearward from the predetermined first alert target area, control the notification device to issue the predetermined alert, the notification device includes an image display configured to display an image representing a position of the detected obstacle and the predetermined first or second alert target area, each of the predetermined first alert target area and the predetermined second alert target area is symmetrically arranged about a centerline passing through a central part in a vehicle width direction and have an annular fan shape from a plan view of the own vehicle, each of the predetermined first alert target area and the predetermined second alert target area is equally divided, in a radial direction of the annular fan shape, into a plurality of sections, wherein each section of the plurality of sections is further divided, in a circumferential direction of the annular fan shape, into a plurality of parts, and the processor is configured to issue the predetermined alert by causing at least one of the plurality of parts displayed in the image and corresponding to the position of the detected obstacle to flash.

2. The driving assistance device according to claim 1, wherein:

the processor is configured to detect a protrusion length of the tailgate or the cargo from the rear end of the rear bumper, and determine the predetermined second alert target area based on the detected protrusion length.

3. The driving assistance device according to claim 1, wherein the notification device further includes an audio device configured to play a predetermined alert sound, and the processor is configured to, in response to detecting the presence of the obstacle behind the own vehicle, cause the at least one of the plurality of parts displayed in the image to flash by inverting a color of the image, and cause the audio device to play the predetermined alert sound.

4. The driving assistance device according to claim 3, wherein the rear sensor includes a sonar configured to emit ultrasonic waves and receive the ultrasonic waves reflected by the obstacles, a tailgate sensor configured to switch the tailgate between a closed state and an opened state, and a camera configured to capture an area behind the own vehicle to acquire image data, and the processor is configured to, in response to (i) the tailgate sensor being switched to the closed state of the tailgate, (ii) recognizing an absence of the cargo based on the image data acquired by the camera, and (iii) determining a range of a position change of an object immediately behind the own vehicle exceeding a threshold based on the image data acquired by the camera, determine that the own vehicle is in the first situation.

5. The driving assistance device according to claim 4, wherein the processor is configured to, in response to determining that the own vehicle is in the first situation, cause the image display to display the predetermined first alert target area, and in response to determining that the own vehicle is in the second situation, cause the image display to display the predetermined second alert target area, wherein the plurality of sections of the predetermined second alert target area has at least one section extended or offset rearward beyond a rearmost section of the plurality of sections of the predetermined first alert target area.

6. A driving assistance device, comprising:

a rear sensor configured to acquire information about obstacles located behind an own vehicle; and a processor configured to, in response to detecting a presence of an obstacle within an alert target area extending rearward based on the information obtained from the rear sensor, control a notification device of the own vehicle to issue a predetermined alert to a driver of the own vehicle; wherein the processor is configured to, in a first situation where a tailgate of the own vehicle and a cargo of the own vehicle do not protrude rearward beyond a rear end of a rear bumper of the own vehicle, and in response to detecting the presence of the obstacle within a first section of the alert target area, control the notification device to issue a first alert; and in a second situation where a part of the tailgate, which is opened or a part of the cargo protrudes rearward beyond the rear end of the rear bumper, and in response to detecting the presence of the obstacle within the first section, control the notification device to issue a second alert, which is a higher-level alert than the first alert, the notification device includes an image display configured to display an image representing a position of the detected obstacle and the alert target area, the alert target area is symmetrically arranged about a centerline passing through a central part in a vehicle width direction and have an annular fan shape from a plan view of the own vehicle, the alert target area is equally divided, in a radial direction of the annular fan shape, into a plurality of sections, wherein each section of the plurality of sections is further divided, in a circumferential direction of the annular fan shape, into a plurality of parts, the first section is at least one of the plurality of sections of the alert target area, and the processor is configured to issue the first alert by causing at least one of the plurality of parts in the first section displayed in the image and corresponding to the position of the detected obstacle to flash at a first interval, and issue the second alert by causing the at least one of the plurality of parts in the first section displayed in the image and corresponding to the position of the detected obstacle to flash at a second interval shorter than the first interval.

7. The driving assistance device according to claim 6, wherein the plurality of sections includes
the first section being an innermost section, and
a second section different from the first section, and
the processor is configured to, in the first situation and the second situation, in response to detecting the presence of the obstacle within the second section, control the notification device to issue the first alert.

8. The driving assistance device according to claim 7, wherein
the notification device further includes an audio device configured to play a predetermined alert sound, and
the processor is configured to, in the second situation, in response to detecting the presence of the obstacle within the first section,
cause the at least one of the plurality of parts displayed in the image to flash by inverting a color of the image at the second interval, and
cause the audio device to play the predetermined alert sound at the second interval.

9. The driving assistance device according to claim 8, wherein
the rear sensor includes
a sonar configured to emit ultrasonic waves and receive the ultrasonic waves reflected by the obstacles,
a tailgate sensor configured to switch the tailgate between a closed state and an opened state, and
a camera configured to capture an area behind the own vehicle to acquire image data, and
the processor is configured to, in response to (i) the tailgate sensor being switched to the closed state of the tailgate, (ii) recognizing an absence of the cargo based on the image data acquired by the camera, and (iii) determining a range of a position change of an object immediately behind the own vehicle exceeding a threshold based on the image data acquired by the camera, determine that the own vehicle is in the first situation.

10. A non-transitory storage medium storing a driving assistance program for causing a computer equipped in an own vehicle to execute:
acquiring, by a rear sensor, information about obstacles located behind the own vehicle; and
in response to detecting a presence of an obstacle behind the own vehicle based on the information obtained from the rear sensor, controlling a notification device of the own vehicle to issue a predetermined alert to a driver of the own vehicle; wherein
the controlling of the notification device includes
in a first situation where a tailgate of the own vehicle and a cargo of the own vehicle do not protrude rearward beyond a rear end of a rear bumper of the own vehicle, and in response to detecting the presence of the obstacle behind the own vehicle within a predetermined first alert target area extending rearward of the own vehicle, issuing the predetermined alert; and
in a second situation where a part of the tailgate, which is opened, or a part of the cargo protrudes rearward beyond the rear end of the rear bumper, and in response to detecting the presence of the obstacle behind the own vehicle within a predetermined second alert target area, which is extended or offset rearward from the predetermined first alert target area, issuing the predetermined alert, the notification device includes an image display configured to display an image representing a position of the detected obstacle and the predetermined first or second alert target area,
each of the predetermined first alert target area and the predetermined second alert target area is symmetrically arranged about a centerline passing through a central part in a vehicle width direction and have an annular fan shape from a plan view of the own vehicle,
each of the predetermined first alert target area and the predetermined second alert target area is equally divided, in a radial direction of the annular fan shape, into a plurality of sections, wherein each section of the plurality of sections is further divided, in a circumferential direction of the annular fan shape, into a plurality of parts, and
the controlling of the notification device includes issuing the predetermined alert by causing at least one of the plurality of parts displayed in the image and corresponding to the position of the detected obstacle to flash.

11. The non-transitory storage medium according to claim 10, wherein
the notification device further includes an audio device configured to play a predetermined alert sound, and
in response to detecting the presence of the obstacle behind the own vehicle,
the at least one of the plurality of parts displayed in the image is caused to flash by inverting a color of the image, and
the audio device is caused to play the predetermined alert sound.

12. The non-transitory storage medium according to claim 11, wherein
the rear sensor includes
a sonar configured to emit ultrasonic waves and receive the ultrasonic waves reflected by the obstacles,
a tailgate sensor configured to switch the tailgate between a closed state and an opened state, and
a camera configured to capture an area behind the own vehicle to acquire image data, and
in response to (i) the tailgate sensor being switched to the closed state of the tailgate, (ii) recognizing an absence of the cargo based on the image data acquired by the camera, and (iii) determining a range of a position change of an object immediately behind the own vehicle exceeding a threshold based on the image data acquired by the camera, the computer is caused to determine that the own vehicle is in the first situation.

13. The non-transitory storage medium according to claim 12, wherein
in response to determining that the own vehicle is in the first situation, the image display is caused to display the predetermined first alert target area, and
in response to determining that the own vehicle is in the second situation, the image display is caused to display the predetermined second alert target area, wherein the plurality of sections of the predetermined second alert target area has at least one section extended or offset rearward beyond a rearmost section of the plurality of sections of the predetermined first alert target area.

14. A non-transitory storage medium storing a driving assistance program for causing a computer equipped in an own vehicle to execute:
acquiring, by a rear sensor, information about obstacles located behind the own vehicle; and in response to detecting a presence of an obstacle within an alert target area extending rearward based on the information obtained from the rear sensor, controlling a notification device of the own vehicle to issue a predetermined alert to a driver of the own vehicle; wherein the controlling of the notification device includes
- in a first situation where a tail gate of the own vehicle and a cargo of the own vehicle do not protrude rearward beyond a rear end of a rear bumper of the own vehicle, and in response to detecting the presence of the obstacle within a first section of the alert target area, issuing a first alert; and
- in a second situation where a part of the tailgate, which is opened, or a part of the cargo protrudes rearward beyond the rear end of the rear bumper, and in response to detecting the presence of the obstacle within the first section, issuing a second alert, which is a higher-level alert than the first alert, the notification device includes an image display configured to display an image representing a position of the detected obstacle and the alert target area, the alert target area is symmetrically arranged about a centerline passing through a central part in a vehicle width direction and have an annular fan shape from a plan view of the own vehicle, the alert target area is equally divided, in a radial direction of the annular fan shape, into a plurality of sections, wherein each section of the plurality of sections is further divided, in a circumferential direction of the annular fan shape, into a plurality of parts, the first section is at least one of the plurality of sections of the alert target area, and the controlling of the notification device includes
- issuing the first alert by causing at least one of the plurality of parts in the first section displayed in the image and corresponding to the position of the detected obstacle to flash at a first interval, and
- issuing the second alert by causing the at least one of the plurality of parts in the first section displayed in the image and corresponding to the position of the detected obstacle to flash at a second interval shorter than the first interval.

15. The non-transitory storage medium according to claim 14, wherein
the plurality of sections includes
- the first section being an innermost section, and
- a second section different from the first section, and in the first situation and the second situation, in response to detecting the presence of the obstacle within the second section, the notification device is controlled to issue the first alert.

16. The non-transitory storage medium according to claim 15, wherein
the notification device further includes an audio device configured to play a predetermined alert sound, and
in the second situation, in response to detecting the presence of the obstacle within the first section,
- the at least one of the plurality of parts displayed in the image is caused to flash by inverting a color of the image at the second interval, and
- the audio device is caused to play the predetermined alert sound at the second interval.

17. The non-transitory storage medium according to claim 16, wherein
the rear sensor includes
- a sonar configured to emit ultrasonic waves and receive the ultrasonic waves reflected by the obstacles,
- a tailgate sensor configured to switch the tailgate between a closed state and an opened state, and
- a camera configured to capture an area behind the own vehicle to acquire image data, and in response to (i) the tailgate sensor being switched to the closed state of the tailgate, (ii) recognizing an absence of the cargo based on the image data acquired by the camera, and (iii) determining a range of a position change of an object immediately behind the own vehicle exceeding a threshold based on the image data acquired by the camera, the computer is caused to determine that the own vehicle is in the first situation.

* * * * *